(12) United States Patent
Li et al.

(10) Patent No.: US 11,215,748 B2
(45) Date of Patent: Jan. 4, 2022

(54) HOUSEHOLD LIGHTING LAMP

(71) Applicant: ETI Solid State Lighting (Zhuhai) Ltd., Guangdong (CN)

(72) Inventors: Tinghong Li, Guangdong (CN); Caiwu Zhao, Guangdong (CN); Weiwei Wu, Guangdong (CN)

(73) Assignee: ETI SOLID STATE LIGHTING (ZHUHAI) LTD., Guangdong (CN)

( * ) Notice: Subject to any disclaimer, the term of this patent is extended or adjusted under 35 U.S.C. 154(b) by 0 days.

(21) Appl. No.: 17/229,646

(22) Filed: Apr. 13, 2021

(65) Prior Publication Data

US 2021/0318486 A1    Oct. 14, 2021

(30) Foreign Application Priority Data

Apr. 13, 2020  (CN) .......................... 202020534934.4

(51) Int. Cl.
| | |
|---|---|
| *F21V 8/00* | (2006.01) |
| *F21V 21/02* | (2006.01) |
| *F21V 29/70* | (2015.01) |
| *F21Y 103/10* | (2016.01) |

(52) U.S. Cl.
CPC ............ *G02B 6/0083* (2013.01); *F21V 21/02* (2013.01); *G02B 6/0076* (2013.01); *G02B 6/0088* (2013.01); *G02B 6/0091* (2013.01); *F21V 29/70* (2015.01); *F21Y 2103/10* (2016.08)

(58) Field of Classification Search
CPC .. G02B 6/0083; G02B 6/0076; G02B 6/0088; G02B 6/0091; F21V 21/02; F21V 29/70; F21Y 2103/10
See application file for complete search history.

(56) References Cited

U.S. PATENT DOCUMENTS 4,223,374 A * 9/1980 Kimmel ................ F21S 19/005
                                                        362/556

FOREIGN PATENT DOCUMENTS

| CA | 3064922 A1 * | 5/2020 | ............ F21S 8/033 |
|---|---|---|---|
| CN | 103363501 A * | 10/2013 | |
| CN | 203980041 U * | 12/2014 | |
| CN | 107726164 A * | 2/2018 | |
| CN | 107740972 A * | 2/2018 | |
| CN | 207034874 U * | 2/2018 | |
| KR | 2016137461 A * | 11/2016 | |
| WO | WO-2019132094 A1 * | 7/2019 | ................ F21S 8/04 |

* cited by examiner

*Primary Examiner* — Mary Ellen Bowman
(74) *Attorney, Agent, or Firm* — Gregory M. Howison

(57) ABSTRACT

The present disclosure discloses a household lighting lamp, including a lamp holder, a main light-emitting component and a secondary light-emitting component; wherein a front panel is provided at a front side of the lamp holder, a mounting portion is provided on a rear side of the lamp holder, the main light-emitting component is provided in front of the lamp holder, the secondary light-emitting component is provided in rear and/or on a side of the lamp holder, and both the main light-emitting component and the secondary light-emitting component are electrically connected to a control circuit. The present disclosure can conveniently adjust the illumination of the lighting lamp, has good light comfort, and can adapt to the needs of users for different scenes.

9 Claims, 5 Drawing Sheets

HOUSEHOLD LIGHTING LAMP

CROSS-REFERENCE TO RELATED APPLICATIONS

This application claims benefit to Chinese application no. 202020534934.4, filed Apr. 13, 2020, the specification of which is incorporated herein by reference.

TECHNICAL FIELD

The present disclosure relates to the field of illumination, and particularly to a household lighting lamp.

BACKGROUND

In the field of home decoration, household lighting lamp has far exceeded the ordinary lighting function. While the basic lighting function is satisfied, people also need to consider the application scenarios of the lighting lamp and the user's pursuit of comfort of the light sensitivity.

For the traditional lighting lamps, the user's requirements for comfort of the light sensitivity are often ignored, and the environmental quality of the lighting lamps is greatly reduced, which affects the experience of the user.

SUMMARY

The purpose of the present disclosure is to provide a household lighting lamp. The present disclosure can conveniently adjust the illumination of the lighting lamp, has good light comfort, and accordingly can adapt to the requirements of users for different scenes.

The technical solution is as provided follows.

In the present disclosure, a household lighting lamp is provided, which includes a lamp holder, a main light-emitting component and a secondary light-emitting component; a front panel is provided at a front side of the lamp holder, a mounting portion is provided on a rear side of the lamp holder, the main light-emitting component is provided in front of the lamp holder, the secondary light-emitting component is provided in rear and/or on a side of the lamp holder, and both the main light-emitting component and the secondary light-emitting component are electrically connected to a control circuit.

In an embodiment, the main light-emitting component includes a main light source and a main light-guide element, the main light source is electrically connected to the control circuit, and the main light-guide element is in front of the lamp holder.

In an embodiment, the main light-guide element is a main light-guide plate, and the main light source is provided at a lateral edge of the main light-guide element and forms a guide light connection with the main light-guide element.

In an embodiment, the household lighting lamp further includes a boundary frame, the main light source is provided on an inner side of the boundary frame and surrounds an outer edge of the main light-guide plate.

In an embodiment, the secondary light-emitting component includes a secondary light source and a secondary light-guide element, the secondary light source is electrically connected to the control circuit, the secondary light-guide element is located in front of or on a side of the lamp holder, the secondary light source and the secondary light-guide element form a light guide connection.

In an embodiment, a ring holder is provided on a rear side of the lamp holder, the secondary light source is provided on the ring holder, the secondary light-guide element is provided in rear and/or on a side of the ring holder.

In an embodiment, an outer periphery of the ring holder has a circumferential side wall, the secondary light source is a light strip, and the light strip is wrapped around the circumferential side wall, the secondary light-guide element is a light guide ring which is clamped on an outer side of the circumferential side wall.

In an embodiment, the secondary light-guide element is a ring-shaped cover plate provided on a rear side of the lamp holder, a ring groove is provided on a front side of the ring-shaped cover plate, the secondary light source is provided in the ring groove, and the ring-shaped cover plate at least has a side light guide edge.

In an embodiment, the ring-shaped cover plate further has a rear light guide edge.

In an embodiment, the lamp holder has an outer edge, the main light-emitting component includes a main light source and a main light-guide component, the secondary light-emitting component includes a secondary light source and a secondary light-guide element, a distance between the main light-guide element and the outer edge is shorter than a distance between the secondary light-guide element and the outer edge.

A household lighting lamp control method includes:
receiving, by a control circuit, a control signal;
when the control signal is a "main light on" signal, turning on a main light source and turning off a secondary light source, the main light source transmitting light to a main light-guide element, and the main light-guide element guiding the light to front of the lighting lamp;
when the control signal is a "secondary light on" signal, turning on the secondary light source and turning off the main light source, the secondary light source transmitting the light to the secondary light-guide element, and the secondary light-guide element guiding the light to the side or rear of the lighting lamp, the light being transmitted after being reflected off a wall.

The technical solution provided by the present disclosure has the following advantages and effects.

In the lighting lamp of the present disclosure, when the main light-emitting component is turned on, the light of the main light-emitting component is emitted through the front of the lighting lamp, which can meet the direct light requirement, and the light illumination intensity is high, which is suitable for the situation of large light. When the secondary light-emitting component is turned on, the light of the secondary light-emitting component is emitted through the side or rear of the lighting lamp to avoid the direct light irradiation. The light can be reflected or diffused by the wall or other surrounding environments, and the intensity of the light is greatly reduced. Accordingly, the uniformity of the light is more ideal and the light is softer, which is more suitable for small light conditions at this time. The main light and the atmosphere light are separated and are controlled independently, which can satisfy different lighting requirements of users and have a good light comfort.

BRIEF DESCRIPTION OF THE DRAWINGS

The accompanying drawings here show specific examples of the technical solution of the present disclosure, and form a part of the specification with the specific embodiments in order to explain the technical solution, principles and effects of the present disclosure.

Unless otherwise specified or defined otherwise, in different drawings, the same reference signs represent the same

DESCRIPTION OF REFERENCE SIGNS 11, mounting bracket; 12, ceiling mounting bracket; 13, lamp disc; 14, chassis; 141, ring holder; 1411, circumferential side wall; 142, heat dissipation frame; 20, main light source; 21, main light-guide element; 30, secondary light source; 31, secondary light-guide element; 311, side light-guide edge; 312, rear light-guide edge; 313, ring groove; 40, boundary frame; 41, screw; 50, power supply.

DETAILED DESCRIPTION

In order to facilitate the understanding of the present disclosure, specific embodiments of the present disclosure will be described in more detail below with reference to the accompanying drawings of the specification.

Unless specifically stated or defined otherwise, all technical and scientific terms used herein have the same meaning as commonly understood by those skilled in the art. In the case of combining the real scene of the technical solution of the present disclosure, all the technical and scientific terms used herein can also have meanings corresponding to the purpose of realizing the technical solution of the present disclosure.

Unless otherwise specified or defined otherwise, the expressions "first, second . . . " used herein are merely used for distinguishing the names, and does not represent a specific number or order.

Unless specifically stated or fined otherwise, the term "and/or" as used herein includes any and all combinations of one or more related listed items.

It should be noted that when a component is considered to be "fixed" to another component, it can be directly fixed to another component, or there may be an intermediate component. When a component is considered to be "connected" to another component, it can be directly connected to another component, or there may be an intermediate component at the same time. When a component is considered to be "mounted on" another component, it can be directly mounted on another component, or there may be an intermediate component at the same time. When a component is considered to be "provided on" another component, it can be directly provided on the other component, or there may be an intermediate component at the same time.

Unless specifically stated or defined otherwise, the expressions "said" and "the" used herein refer to the technical features or technical contents previously mentioned or described in the corresponding positions, which may be the same as or similar to the technical features or the technical contents referred to.

Undoubtedly, technical contents or technical features that are contrary to the purpose of the present disclosure or are obviously contradictory should be excluded.

Embodiment I

Figure 1:
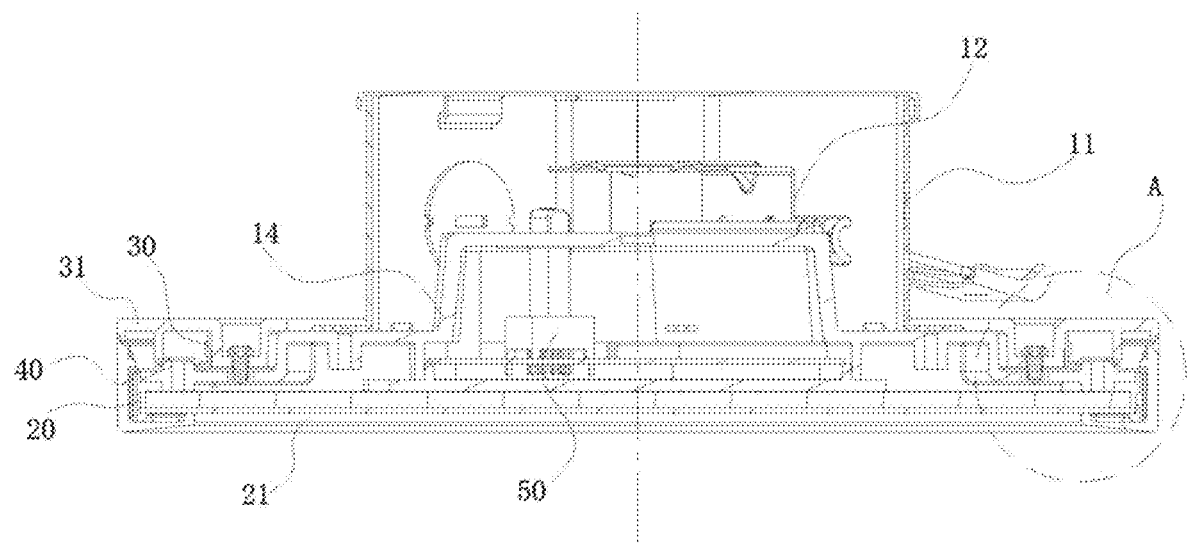
FIG. 1 is a side section view of a household lighting lamp according to an embodiment I of the present disclosure.
Figure 2:
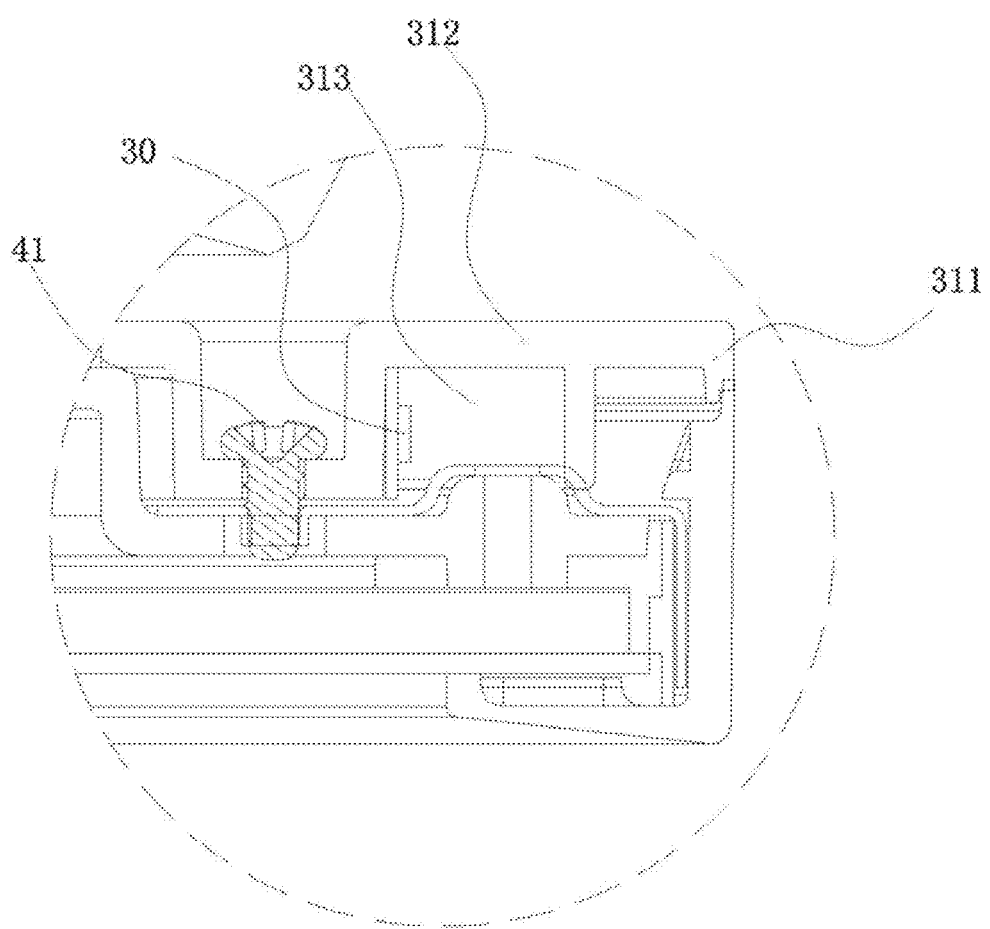
FIG. 2 is a partial enlarged view of a portion A in FIG. 1.
Figure 3:
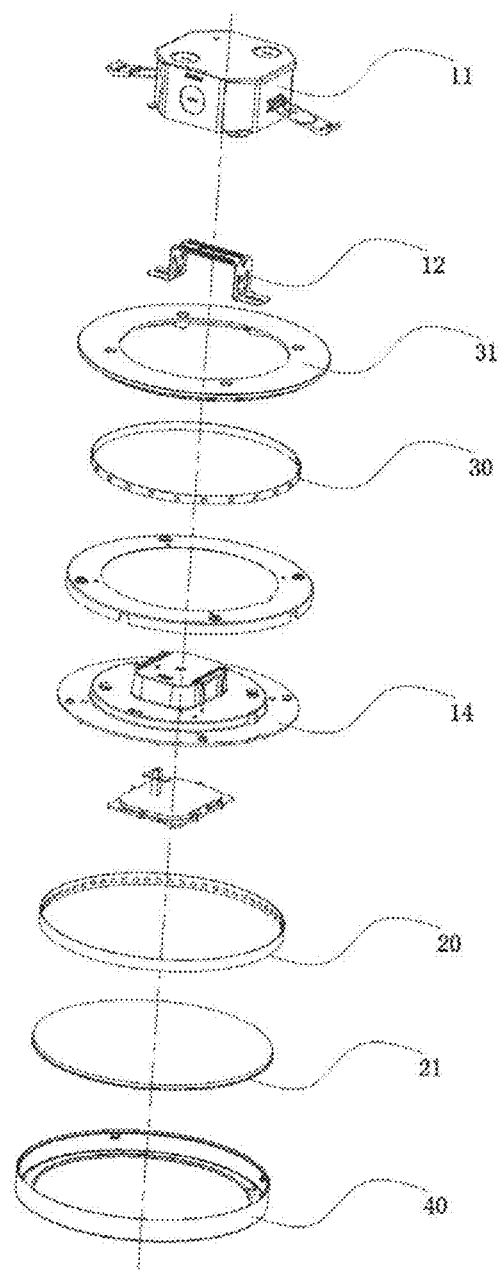
FIG. 3 is an exploded view of the household lighting lamp according to the embodiment I of the present disclosure.

As shown in FIGS. 1 to 3, a household lighting lamp is provided. The household lighting lamp in this embodiment is a down lamp, which includes a lamp holder formed by a mounting bracket 11, a ceiling mounting bracket 12, and a chassis 14 which are fixedly connected. A front panel is provided at a front side of the chassis; and a mounting portion is provided at a rear side of the lamp holder and is configured to mount and fix the lighting lamp.

A main light-guide element 21 consisting of a light-guide three-piece set is provided in front of the chassis 14; a main light source 20 is provided at a lateral edge position of the main light-guide element 21 (that is, a light strip is adopted to surround the circumferential side of the main light-guide element 21); and a boundary frame 40 is provided on the circumferential outer side of the main light source 20.

A ring-shaped cover plate provided on the rear side of the chassis 14 is a secondary light-guide element 31; a ring groove 313 is provided on the front side of the ring-shaped cover plate; and a secondary light source 30 is provided in the ring groove 313, The ring-shaped cover plate is fixed on the chassis 14 by screws; and the ring-shaped cover plate has a side light-guide edge 311 and a rear light-guide edge 312.

A power supply module is mounted in the lamp holder; the main light source 20 and the secondary light source 30 are simultaneously electrically connected to a control circuit including the power supply module.

A distance between the main light-guide element 21 and an outer edge is shorter than a distance between the secondary light-guide element 31 and the outer edge, which can ensure that the light emitted from the main light source 20 is emitted toward the front of the lighting lamp as much as possible. On the other hand, the blocking of the light emitted from the secondary light source 30 can be avoided when the light is emitted toward the front of the lighting lamp.

A method for controlling a household lighting lamp in the embodiment is provided as follows.

The control circuit receives a control signal to control the main light source 20 or the secondary light source 30 of the lighting lamp. For example:

In the case of insufficient light at night, it is necessary to turn on a strong lighting mode. At this time, when the "main light on" signal is output through a switch, the main light source 20 is turned on, the secondary light source 30 is turned off, and the main light source 20 transmits the light to the main light-guide element 21. The main light-guide element 21 guides the light to the front of the lighting lamp.

When a weak lighting mode needs to be turned on before going to bed and the "secondary light on" signal is output through the switch, the secondary light source 30 is turned on, the main light source 20 is turned off, and the secondary light source 30 transmits the light to the secondary light-guide element 31. The secondary light-guide element 31 guides the light to the side and rear of the lighting lamp, and then the light is transmitted after being reflected by a wall. At this time, the light emitted by the lighting lamp becomes very weak, and the light is not directly projected, but is transmitted after being reflected off the wall on the side or in rear of the lighting lamp.

It can be understood that, in this embodiment, in order to add more lighting modes, the main light source 20 and the secondary light source 30 can be turned on simultaneously by the control circuit, or the main light source 20 and the secondary light source 30 can be turned on alternatively. The control signal described in this embodiment may be in a mode of combining a control switch with a built-in control chip, or in a mode of simply inputting a control mode.

Compared with the existing lighting lamps, the lighting lamp described in this embodiment has obvious advantages:

When a main light-emitting component is turned on, the light of the main light-emitting component is emitted through the front of the lighting lamp, which can meet the direct light requirements. The light illumination intensity is high and suitable for large light conditions. When the secondary light-emitting component is turned on, the light of the secondary light-emitting component is emitted through the side or rear of the lighting lamp to avoid direct light irradiation. The light can be reflected or diffused through the wall or other surrounding environments. The intensity of the light is greatly reduced, the uniformity of the light is more ideal, and the light is softer, which is more suitable for small light conditions at this time. The main lamp and the ambient lamp are separated and are independently controlled to meet different lighting requirements of users, which has a good light comfort.

Embodiment II

Figure 4:
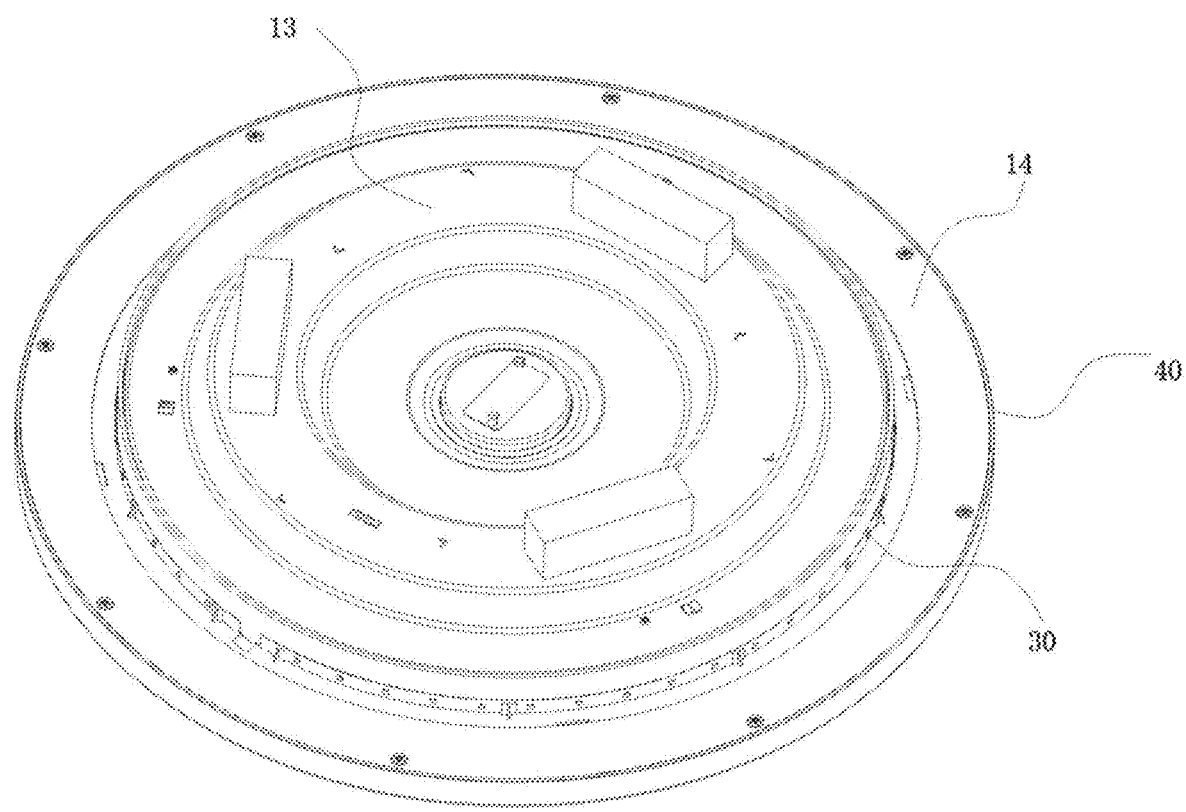
FIG. 4 is a rear side view of a household lighting lamp according to an embodiment II of the present disclosure.
Figure 5:
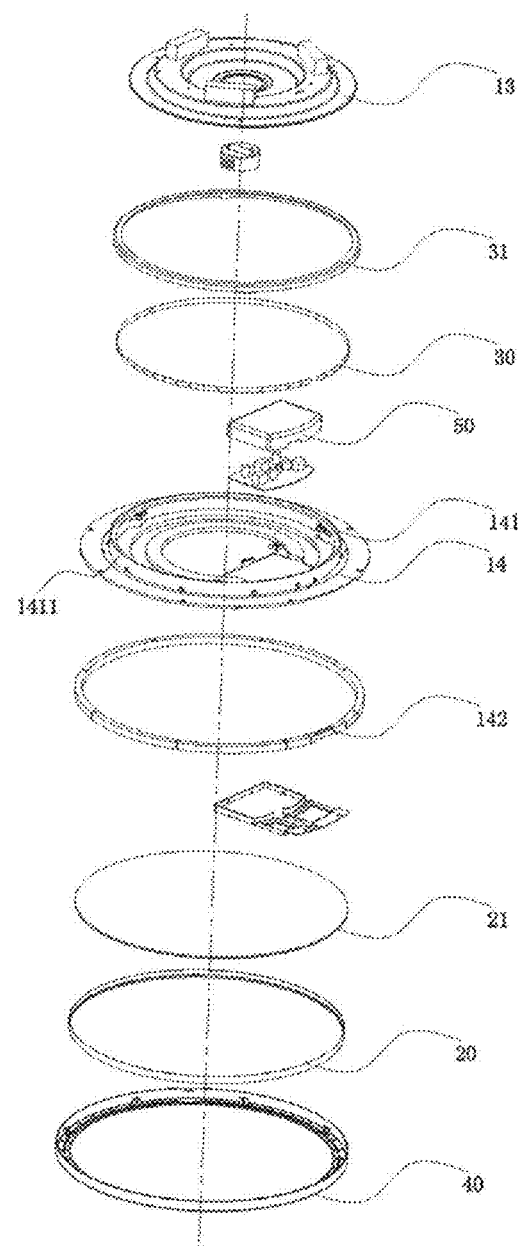
FIG. 5 is an exploded view of the household lighting lamp according to the embodiment II of the present disclosure.

As shown in FIGS. 4 and 5, the household lighting lamp in this embodiment is a ceiling lamp. In this embodiment, the ceiling lamp includes a lamp holder formed by a lamp disc 13 and a chassis 14 which are fixedly connected. The lamp disc 13 is configured to mount and fix the lighting lamp onto the wall.

A ring holder 141 is provided on the rear side of the chassis 14; the outer circumference of the ring holder 141 has a circumferential side wall 1411, and a heat dissipation frame 142 is provided on the circumferential side wall 1411. The secondary light source 30 is a light strip. The light strip is wrapped around the heat dissipation frame 142 on the circumferential side wall 1411; the secondary light-guide element 31 is a light guide ring, and is clamped on the outer side of the circumferential side wall 1411.

The principles and advantages of this embodiment are the same as those of the embodiment I, and will not be repeated here.

In the foregoing embodiment, the main light source 20 and the main light-guide element 21 form a light guide connection; the secondary light source 30 and the secondary light-guide element 31 form a light guide connection; and the functions are that: the light emitted by the main light source 20 enters the main light-guide element 21, and is transmitted after being guided by the main light-guide element 21; the light emitted by the secondary light source 30 enters the secondary light-guide element 31, and then is transmitted after being guided by the secondary light-guide element 31; a direct contact installation or a non-direct contact installation may exist between the main light source 20 and the main light-guide element 21, and between the secondary light source 30 and the secondary light-guide element 31.

The purpose of the above embodiments is to exemplarily reproduce and derive the technical solution of the present disclosure, and to completely describe the technical solution, purpose and effect of the present disclosure, in order to make the public understand the present disclosure of the present disclosure more thorough and comprehensive, which does not limit the protection scope of the present disclosure.

The above embodiments are not an exhaustive list based on the present disclosure. In addition to this, there may be many other embodiments not listed. Any replacement and improvement made on the basis of not violating the concept of the present disclosure shall fall within the scope of protection of the present disclosure.

What is claimed is:

1. A household lighting lamp, comprising a lamp holder, a main light-emitting component and a secondary light-emitting component; wherein a front panel is provided at a front side of the lamp holder, a mounting portion is provided on a rear side of the lamp holder, the main light-emitting component is provided in front of the lamp holder, the secondary light-emitting component is provided in rear and/or on a side of the lamp holder, and both the main light-emitting component and the secondary light-emitting component are electrically connected to a control circuit;

wherein the secondary light-emitting component comprises a secondary light source and a secondary light-guide element, the secondary light source is electrically connected to the control circuit, the secondary light-guide element is located in front of or on a side of the lamp holder, the secondary light source and the secondary light-guide element form a light guide connection; and wherein the secondary light-guide element is a ring-shaped cover plate provided on a rear side of the lamp holder, a ring groove is provided on a front side of the ring-shaped cover plate, the secondary light source is provided in the ring groove, and the ring-shaped cover plate at least has a side light guide edge.

2. The household lighting lamp of claim 1, wherein the main light-emitting component comprises a main light source and a main light-guide element, the main light source is electrically connected to the control circuit, and the main light-guide element is in front of the lamp holder.

3. The household lighting lamp of claim 2, wherein the main light-guide element is a main light-guide plate, and the main light source is provided at a lateral edge of the main light-guide element and forms a guide light connection with the main light-guide element.

4. The household lighting lamp of claim 3, further comprising a boundary frame, wherein the main light source is provided on an inner side of the boundary frame and surrounds an outer edge of the main light-guide plate.

5. The household lighting lamp of claim 1, wherein a ring holder is provided on a rear side of the lamp holder, the secondary light source is provided on the ring holder, the secondary light-guide element is provided in rear and/or on a side of the ring holder.

6. The household lighting lamp of claim 5, wherein an outer periphery of the ring holder has a circumferential side wall, the secondary light source is a light strip, and the light strip is wrapped around the circumferential side wall, the secondary light-guide element is a light guide ring which is clamped on an outer side of the circumferential side wall.

7. The household lighting lamp of claim 1, wherein the ring-shaped cover plate further has a rear light guide edge.

8. The household lighting lamp of claim 1, wherein the lamp holder has an outer edge, the main light-emitting component comprises a main light source and a main light-guide component, the secondary light-emitting component comprises a secondary light source and a secondary light-guide element, a distance between the main light-guide element and the outer edge is shorter than a distance between the secondary light-guide element and the outer edge.

9. A household lighting lamp control method, comprising:
receiving, by a control circuit, a control signal;
when the control signal is a "main light on" signal, turning on a main light source and turning off a secondary light source, transmitting, by the main light source, light to a main light-guide element, and guiding, by a main light-guide element, the light to front of the lighting lamp;

when the control signal is a "secondary light on" signal, turning on the secondary light source and turning off the main light source, transmitting, by the secondary light source, the light to a secondary light-guide element, and guiding, by the secondary light-guide element, the light to a side or rear of the lighting lamp, wherein the light is transmitted after being reflected off a wall;

wherein the secondary light source is electrically connected to the control circuit, the secondary light-guide element is located in front of or on a side of the lamp holder, the secondary light source and the secondary light-guide element form a light guide connection; and wherein the secondary light-guide element is a ring-shaped cover plate provided on a rear side of the lamp holder, a ring groove is provided on a front side of the ring-shaped cover plate, the secondary light source is provided in the ring groove, and the ring-shaped cover plate at least has a side light guide edge.

\* \* \* \* \*